June 17, 1969     J. S. WAJDIK     3,450,091

MULTI-TURN INDICATOR DIAL SYSTEM

Filed March 20, 1967

INVENTOR.
JOSEPH S WAJDIK
BY
Nilsson Robbins & Anderson
ATTORNEYS

United States Patent Office 3,450,091
Patented June 17, 1969

3,450,091
MULTI-TURN INDICATOR DIAL SYSTEM
Joseph S. Wajdik, Glendora, Calif., assignor to Spectrol Electronics Corporation, City of Industry, Calif., a corporation of Delaware
Filed Mar. 20, 1967, Ser. No. 624,609
Int. Cl. G09f 9/00
U.S. Cl. 116—133                                    8 Claims

ABSTRACT OF THE DISCLOSURE

A direct reading multi-turn dial and turns indicator assembly to count the number of revolutions and portions of revolutions. A first control or "turns portion" driving dial is rotatably coupled by means of a Geneva-like three tooth intermediate gear means to a second "turns" dial. The rear surface of the first driving dial carries a single transfer tooth which rotationally drives the Geneva-like intermediate gear means. A shoulder having a relieved portion is also provided on the rear surface of the first dial in a region radially contiguous to the transfer pin providing a clearance for the rotation of the Geneva-like intermediate gear. A brake shoe mechanism is also provided for the first dial to lock it in any position against rotation.

This invention relates generally to control and indicating dials and more particularly to such devices which embody intercoupled revolutions and portions of revolutions indicators.

Background of the invention

Although the present invention finds particularly advantageous application in control and indicating dial systems for multi-turn potentiometers and the like, and although, in the cause of brevity and clarity, much of the following discussion and description of examples of the invention relate particularly thereto, it is expressly to be understood that the advantages of the invention are equally well manifest in other electrical and electromechanical and mechanical applications wherein it is desired to know or record the angular travel and disposition of a rotatable body.

In the field of multi-turn potentiometers it is often desirable to know or count the angular displacement of its rotor portion for purposes of such as, for example, determining the magnitude of resistance required for achieving a predetermined effect, for calibration, or for purposes of setting or resetting a particular adjustment.

In the past, various efforts have been expended toward providing such indicator and control dial mechanisms, and such efforts have, in some instances, been directed toward providing a multiple indexing indicating mechanism in which a cascaded chain of two or more dials are intercoupled whereby upon a full revolution of one dial, a succeeding one is rotated a predetermined discrete minor portion of a revolution. Scalers and odometers are general examples of such indicators and counters. Other typical approaches have involved more or less conventional gear chains. These and other prior art efforts have resulted in mechanisms which are either excessively costly, complex, and bulky or have been unreliable or inaccurate. Other disadvantages of these previously available indicator counters have included ambiguous readout particularly during the process of indexing the "turns" indicator. This disadvantage has been particularly aggravated in some instances because the transfer mechanism require a significant portion of a revolution of the "portions" indicator dial to achieve a full indexing of the "revolutions" indicator. Still others are not reversible or exhibit excessive backlash during reversal thereby introducing a magnitude of error which may be intolerable in many applications.

Summary of the invention

Accordingly, it is an object of the present invention to provide a novel multi-turn indicator control dial system which is not subject to these and other disadvantages and limitations of the prior art.

It is another object to provide such mechanism which provides a clear, unambiguous, direct readout of the net multi revolution displacement or angular travel and disposition of a rotatable body.

It is another object to provide such a mechanism which provides a readout of discrete revolutions and portions of revolutions, of the rotatable body.

It is another object to provide such a system in which the revolutions indicator is inherently locked against any change of indicator readout except during its deliberate indexing to a different readout and in which the "portions" indicator is selectively lockable in any rotational disposition.

It is another obect to provide such a mechanism which is exceedingly compact, mechanically simple and reliable over a very long service life, and which embodies a very few, mass-produced parts which may be readily assembled by nonskilled persons.

It is another object to provide such a mechanism which while being exceedingly accurate and exhibiting substantially no backlash between the "turns" and "turns portion" counters, is very inexpensive to produce.

It is another object to provide such a mechanism in which the control knob or dial may be rigidly connected to its object shaft whereby there is no backlash therebetween.

Brief statement of the invention

Briefly, these and other objects of the invention are achieved in accordance with the structural aspects of one example of the invention which includes an indicator base for rotationally holding a "turns" indicator dial, a "turns portion" indicator knob, and an intermediate gear for selectively intercoupling the dial and the knob.

The "turns portion" indicator knob is provided with an axially directed, transfer pin element or cam spaced radially from a substantially circular restraining shoulder formed concentrically about the knob axis and relieved in the region of the transfer pin element to provide intermittent clearance about the pin. The intermediate gear includes a series of facets for slidingly engaging the restraining shoulder, these facets being angularly evenly distributed in an array about the periphery of the gear and peripherally separated from each other by radially directed, transfer pin engaging slots. Rotational intercoupling means are also provided in connection with the intermediate gear for rotationally coupling the intermediate gear to the "turns" indicator dial.

In operation, when the "turns portion" indicator or control knob is rotated so that its transfer pin or cam engages one of the slots in the Geneva motion portion of the intermediate gear, it is rotated by that fraction of a revolution which is the reciprocal of the number of facets in the intermediate gear. This amount of rotation is transferred to the "turns" indicator dial as a discrete angular step causing its readout to change by a predetermined rotational graduation.

Brief description of the drawing

Further details of these and other novel features of the system including means for locking the "turns portion" knob in any desired position as well as additional objects and advantages of the invention and its operation will become apparent and be best understood from a consideration of the following description when taken in connection with the accompanying drawing which is presented by way of an illustrative example only and in which.

Description of the preferred embodiment

Figure 1:
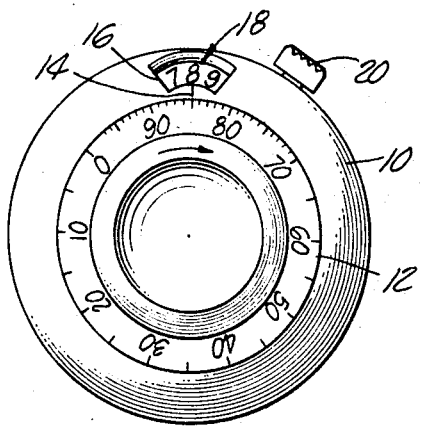
FIGURE 1 is a frontal view of an example of a multi-turn indicator dial system constructed in accordance with the present invention.

With specific reference now to the figures in more detail, it is stressed that the particulars shown are by way of example and for purposes of illustrative discussion only and are presented in the cause of providing what is believed to be the most useful and readily understood description of the principles and structural concepts of the invention. In this regard, no attempt is made to show structural details of the apparatus in more detail than is necessary for a fundamental understanding of the invention. The description taken with the drawing will make it apparent to those skilled in the mechanical arts how the several forms of the invention may be embodied in practice. Specifically, the detailed showing is not to be taken as a limitation upon the scope of the invention.

In FIGURE 1, the example of the multi-turn indicator dial system shown includes a dial base 10 which rotatably supports a turns portion dial 12 mounted substantially centrally thereon and graduated, in this example, in 100ths of a revolution about its periphery and of the character to be read at an index mark 14 etched, as shown, on the top central portion of the dial base 10. Also disposed in the top central portion of the base 10 is a "turns" dial readout window 16 through which may be viewed the top central portion of the "turns" dial 18 also of the character to be read at the index mark 14. A dial lock actuator lever 20 protrudes, as shown, radially beyond the circular periphery of the base 10.

Figure 2:
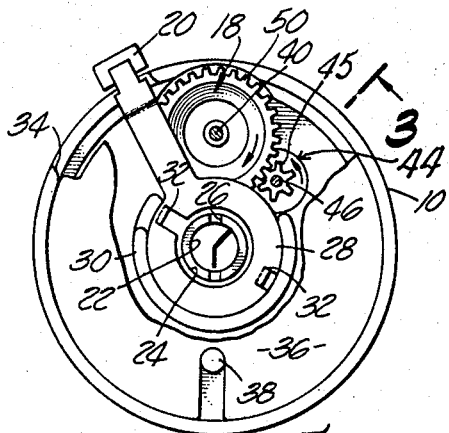
FIGURE 2 is a rear view thereof partially broken away.

Referring to FIGURE 2, a hollow shaft portion 22 of the "turns portion" dial 12 is illustrated as journaled within a supporting bushing 24 formed integrally with the dial base 10. The terminal end of the shaft portion 22 may be provided with engagement notches 26 for rotational intercoupling of the dial with an extrinsic mechanism such as, for example, a multi-turn potentiometer or the like. The brake actuating lever 20 terminates in an annulus portion 28 which is circumdisposed about the shaft portion 22 and retained rotationally within a circular retaining shoulder 30. The annulus portion 28 is provided with a pair of brake shoe actuating tabs 32 which extend axially forwardly to the frontal portion of the base 10 as illustrated below. A rotational displacement of the lever 20 is permitted by the circumferential retaining notch 34 formed in the rear, upper portion of the dial base 10.

A rear cover plate 36 may be provided, as shown, and through which protrudes a panel placement locking pin 38. In addition to minimizing the intrusion of dust and moisture, the plate 36 also serves to retain various of the working elements of the assembly as will be more evident in the subsequent figures.

The "turns" dial 18 is mounted rotationally upon its axial pivot pin portion 40 which is journalled within a small bore 42 (see FIGURE 4) formed in the upper central portion of the dial base 10 and a similar bore (not shown) in the backing cover plate 36.

An intermediate gear 44 is mounted on a shaft 46 which is journalled in a small bore 48 formed in the base 10 and a similar small bore 49 formed in the cover plate 36. The transfer teeth 45 of the gear 44 mesh continuously with a set of gear teeth 50 formed about the periphery of the "turns" dial 18 thereby to provide rotational coupling therebetween.

Figure 3:
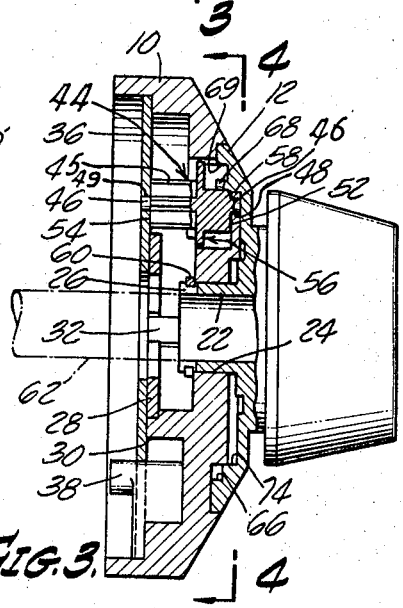
FIGURE 3 is a cross-sectional view of the structure of the previous figures taken along the reference lines 3—3 of FIGURE 2.

As shown in FIGURE 3, the gear 44 is retained, by stopping shoulders 52, 54, between the dial base 10 and the cover plate 36, respectively, while the Geneva motion portion 56 thereof communicates through an access opening 58 in the base 10, with the "turns portion" dial 12.

Also to be noted in connection with FIGURE 3 is the relation of the central, hollow shaft portion 22 of the dial 12 and its retention with the bore 24 by a retaining ring 60. A takeoff or object shaft 62 is shown in dashed lines as coupled to the engagement slots or notches 26. Note also the annulus portion 28 of the brake lever 20 and one of its brake shoe actuating tabs 32.

Figure 4:
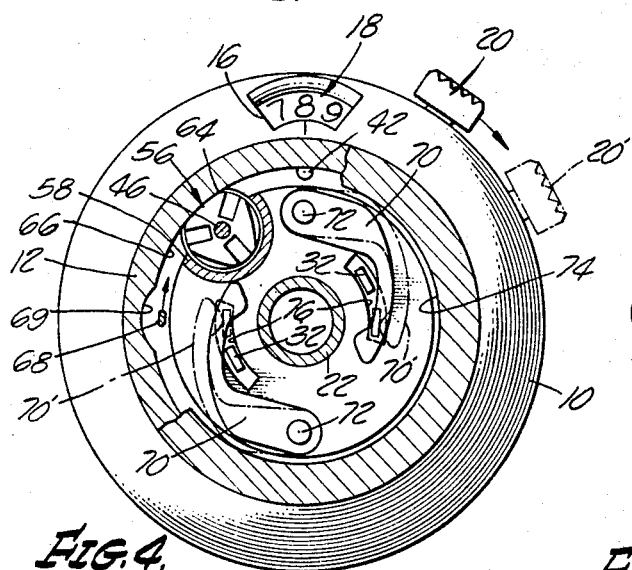
FIGURE 4 is a view like that of FIGURE 1 with a portion of the frontal portions thereof broken away along the lines 4—4 of FIGURE 3 for clarity of internal structural and operational relationships.

Referring specifically to FIGURE 4, the Geneva motion portion 56 of the gear 44 is illustrated as including, in this example, a plurality of three facets 64 (only one of which is numbered) which are normally restrained from rotation by the sliding engagement of one thereof against a cylindrical restraining shoulder surface 66 formed concentrically about the axis of the dial 12 radially inwardly from the outer periphery thereof. Spaced radially inwardly from the restraining shoulder surface 66, is a single tooth or cam in the form of an axially directed transfer pin 68 mounted on the rear surface of the dial 12. In the region radially contiguous to the transfer pin 68, the restraining shoulder surface 66 is relieved as shown to provide a clearance 69 for rotation of the Geneva movement portion 56. The operation and cooperation of these elements is discussed below in connection with the subsequent figures.

With further reference to FIGURE 4, a pair of dial engaging brake shoes 70 is shown housed within the dial 12 and each pivotally mounted on a pin 72. A brake drum in the form of a circular, shoe engaging shoulder 74 is provided, as shown, radially inwardly and axially forwardly of the restraining shoulder 66 and concentric about the shaft portion 22. The brake shoe actuating tabs 32 extend through access openings 76 in the dial base 10 and slidingly engage the brake shoes 70. This engagement urges the shoes radially outwardly in dial rotation impeding relation when the lever 20 is displaced clockwise as indicated by the dashed lines 20'. By similar indication, the shoes 70 are pivotally displaced to their positions 70' in response to such a displacement of the lever 20. Full movement of the lever 20 so that the tabs 32 stop against the clockwise ends of the slots 76 provides a firm and stable lock for the dial 12 with respect to the dial base 10. Furthermore, as will be made more clear below, such a locking inherently precludes rotation of the intermediate gear member and hence also locks, effectively, the "turns" dial 18.

Figure 5:
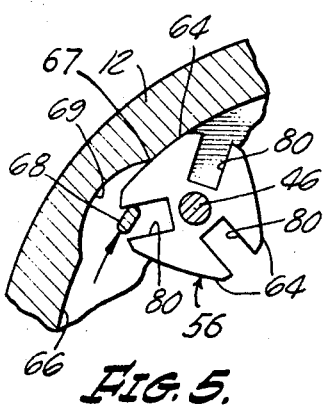
FIGURES 5, 6, and 7 are sectional, broken away views of a portion of the indexing mechanism of the previous figures illustrating a sequential series of operational steps associated with the structural aspects of the invention.

Referring to FIGURE 5, the cooperation of the Geneva motion portion 56 of the intermediate gear 44 with the transfer pin 68 and the clearance 69 to provide a specific 120° rotation of the intermediate gear 44 is illustrated. In FIGURE 5, the dial 12 may be seen to be rotating clockwise with the transfer pin 68 just beginning to engage a transfer pin receiving slot 80 formed radially in the Geneva motion portion 56 and angularly symmetrically between each adjacent pair of the facets 64. In this view, one facet 64 is in sliding engagement with the restraining shoulder surface 66 and thereby restrains the Geneva motion portion 56 from movement until the edge 67 of the relieved portion 69 passes the center of the shaft 46.

Figure 6:
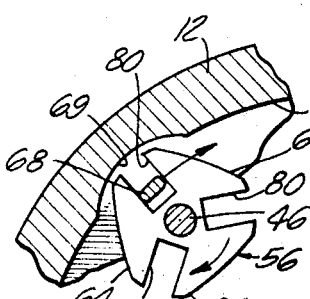

In accordance with the view of FIGURE 6, the dial 12 has been rotated a few degrees further causing the pin 68 to drive the Geneva motion portion 56 clockwise approximately 60°, this rotation about the intermediate gear shaft 46 being permitted by the clearance 69 in the restraining shoulder surface 66.

Figure 7:
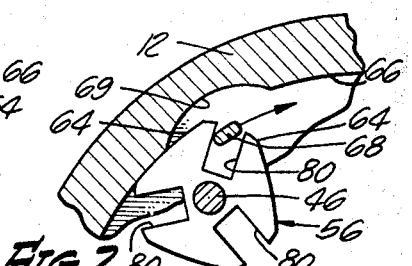

In FIGURE 7, the driven rotation of the Geneva motion portion 56 is shown completed and, again, the engagement of the restraining shoulder surface 66 by a facet 64 precludes further rotation.

The pin 68 is an integral part of the dial 12. When the dial 12 is rotated by hand in either a clockwise or counterclockwise direction, the pin 68 engages a slot 80 in the Geneva motion portion 56. The rotation of the dial 12 thus causes an angular rotation of 120° to the Geneva motion portion 56 which simultaneously rotates the whole gear 44 through 120°. The gear ratios and number of facets being predetermined prescribe the desired angular displacement of the counting dial 18. The counting dial 18 is marked accordingly and is the resultant function of the number of revolutions of the dial 12. For rotational accuracy greater than one revolution, the dial 12 is equally divided into 100 increments. With an indicator provided on the stationary base it is possible to rotate the dial 12 any desired number of revolutions and hundredths of a revolution and obtain an accurate indication thereof.

It may be seen that a 120° rotation of the gear 44 causes a rotation of the "turns" dial equal, in revolution, to the reciprocal of the number of facets 64 reduced by the gear ratio of the gear 44 to the gear 50. If, for example, the "turns" dial has 30 teeth, the gear 44 has 6 teeth, and the number of facets is 3, the resultant number is 1/15. Then each complete discrete movement of the gear 44 will cause 1/15 of a revolution of the "turns" indicator and it may conveniently be marked in 15 equal graduations to be read in cooperation with the index 14 on the face of the dial base 10.

It is reiterated that merely an example of the invention has been shown in detail; for example, in other embodiments of the invention, the number of facets associated with the Geneva motion portion 56 may readily be greater than 3 and the number of transfer pins 68 may be greater than one, with the plurality thereof being distributed about the periphery of the dial 12. It is also to be noted that the continuous, rotational coupling between the gear 44 and the dial 18 may be by means other than gear teeth.

There has thus been disclosed an example of a multiple dial indicator system which achieves the objects and exhibits the advantages set forth hereinabove.

What is claimed is:

1. Multi-turn indicator dial system comprising:
dial base;
first indicator dial means rotationally mounted on said base about a first axis and having a substantially circular restraining shoulder surface disposed substantially concentrically about said first axis and further having at least one transfer element mounted thereon and spaced radially from said restraining shoulder, said shoulder being relieved to provide a clearance contiguously to said transfer element;
second indicator dial means rotationally mounted on said base about a second axis;
intermediate gear means, including a Geneva movement portion, rotationally mounted on said base about a third axis and being rotationally coupled to said second indicator dial means, said Geneva movement portion having a facet for slidingly engaging said restraining shoulder to preclude rotation of said intermediate gear means, and said Geneva movement portion further having a slot for receiving said transfer element to rotate said intermediate gear means and thereby said second indicator dial means upon rotational engagement of said Geneva motion portion by said transfer element when said clearance permits rotation of said Geneva movement portion.

2. The invention according to claim 1 in which said Geneva movement portion comprises an array of restraining shoulder engaging facets angularly evenly restricted about said third axis and peripherally separated from each other by a slot for receiving said transfer element for rotationally driving said intermediate gear means by that fraction of a revolution equal to the reciprocal of the number of said facets in said array.

3. The invention according to claim 1 in which said transfer element includes an axially disposed pin member carried by said first indicator dial means and in which said slots are radially directed.

4. The invention according to claim 1 in which said restraining shoulder comprises an internal, substantially cylindrical surface for engaging said facets and said transfer element comprises an axially directed pin member disposed radially inwardly therefrom.

5. The invention according to claim 1 in which said intermediate gear means includes a first set of gear teeth and said second indicator dial means having a second set of gear teeth meshed with said first set of gear teeth thereby to provide said rotational coupling between said intermediate gear means and said second indicator dial means.

6. The invention according to claim 5 in which said second indicator dial means includes a dial face at least a portion of which is disposed for readout, said dial face being marked in discrete graduations separated by an angular displacement substantially equal to that fraction of the revolution equal to the reciprocal of the number of facets in said array multiplied by the gear ratio between said first and second sets of gears.

7. The invention according to claim 1 which further includes brake means carried by said dial base and including at least one brake shoe element totally mounted on said base and engageable in rotation impeding relation with said first indicator dial means, and brake shoe element actuating means operable externally of said dial base for causing said brake shoe to engage said first indicator dial means in said rotation impeding relation therewith.

8. The invention according to claim 1 which further includes rotation effects takeoff shaft means disposed coaxially with said first axis and connected to said first indicator dial means.

References Cited

UNITED STATES PATENTS

| | | | |
|---|---|---|---|
| 2,151,534 | 3/1939 | Scofield | 116—133 |
| 2,805,636 | 9/1957 | Smith | 116—115 |
| 2,901,998 | 9/1959 | Keith | 116—115 |
| 2,980,055 | 4/1961 | Burns | 116—133 |
| 3,162,172 | 12/1964 | Harrison | 116—133 X |

LOUIS R. PRINCE, *Primary Examiner.*

D. M. YASICH, *Assistant Examiner.*

U.S. Cl. X.R.

74—436